United States Patent [19]

Mehta et al.

[11] 4,410,361

[45] Oct. 18, 1983

[54] METHOD FOR DESILVERIZING AND REMOVAL OF OTHER METAL VALUES FROM LEAD BULLION

[75] Inventors: Jitesh R. Mehta, Eagan, Minn.; Francis M. Dunlevey, Lake Oswego, Oreg.

[73] Assignee: GNB Batteries Inc., Mendota Heights, Minn.

[21] Appl. No.: 335,411

[22] Filed: Dec. 29, 1981

[51] Int. Cl.$^3$ .............................................. C22B 13/06
[52] U.S. Cl. ............................................ 75/63; 75/79
[58] Field of Search ................................ 75/78, 79, 63

[56] References Cited

U.S. PATENT DOCUMENTS

| | | | |
|---|---|---|---|
| 147,454 | 2/1874 | Webster | 75/79 |
| 196,204 | 10/1877 | Eaton | 75/79 |
| 502,122 | 7/1893 | Howard | 75/79 |
| 890,160 | 6/1908 | Morrison | 75/79 |
| 1,428,041 | 9/1922 | Kroll | 75/78 |
| 1,740,752 | 12/1929 | Thompson | 75/78 |
| 1,786,908 | 12/1930 | Hanak | 75/78 |
| 1,853,535 | 4/1932 | Betterton | 75/79 |
| 1,925,687 | 4/1931 | Cohn | 75/78 |
| 2,032,788 | 3/1936 | Betterton et al. | 75/79 |
| 2,062,116 | 11/1936 | Betterton et al. | 75/79 |
| 2,359,718 | 10/1944 | Reinhardt et al. | 75/78 |
| 3,607,232 | 9/1971 | Lebedeff | 75/78 |

*Primary Examiner*—M. J. Andrews
*Attorney, Agent, or Firm*—Augustus J. Hipp

[57] ABSTRACT

A batch process for desilverizing and refining lead bullion containing antimony and a low silver content, including the steps of melting the lead bullion, adding calcium to form a floating silver-rich dross containing a silver-antimony-calcium compound and separating the dross from the desilverized, molten lead bullion. The process further comprises a plurality of successive batch operations wherein silver-rich dross is separated and accumulated in each batch operation for subsequent processing. The successive batch operations are maintained at about 400° C. in order to effect significant savings in energy, time and labor over processes previously used.

42 Claims, No Drawings

METHOD FOR DESILVERIZING AND REMOVAL OF OTHER METAL VALUES FROM LEAD BULLION

TECHNICAL FIELD

This invention relates to the refinement of antimony bearing lead alloys to remove silver and other metal values from lead bullion and, in particular, to an improved process for desilverizing lead bullion having a low silver content.

BACKGROUND ART

In conventional primary smelters, silver is removed from softened lead bullion by conventional Parkes and Williams processes. Each of these processes involves the subjection of the molten soft lead bullion to zinc additions to form a zinc/silver-rich crust with subsequent distillation in a retort separating the zinc from the silver and lead contained in the crust. Silver is subsequently separated from the lead in the crust by the process of cupellation. These processes involve temperatures of about 1200° C., the use of specialized furnace systems, and are relatively slow, requiring, for example, 12 to 14 hours for treatment of a one-ton charge of zinc/silver crust. Resultingly, these processes are relatively expensive in the recovery of silver.

The Betts electrolytic process is another process also commonly used for the separation and recovery of silver and bismuth from the lead bullion. This process involves anodic dissolution of the lead into the electrolyte with accompanying concentration of silver and bismuth on the residual anode as a slime layer. Pure lead is cathodically deposited and the silver and bismuth are recovered from the anode slimes by recovery processes well known to those skilled in the art.

One early patent disclosing the separation of silver from lead utilizing zinc is that of Webster et al U.S. Pat. No. 147,454. Another U.S. patent disclosing a process for removing silver from lead alloys is that of William Morrison No. 890,160. Still another such U.S. patent is that of Jesse O. Betterton et al No. 2,062,116.

In U.S. Pat. No. 1,853,535, Jesse O. Betterton discloses a metal refining process wherein the lead bullion is treated with zinc to remove silver and subsequently with a calcium lead alloy and zinc to remove bismuth.

Another prior patent disclosing the use of calcium or a calcium-containing substance in treating lead dore containing 12 to 14% antimony, 14 to 17.4 oz/ton of silver and 0.38 oz/ton of gold to remove metal values is that of J. C. Reinhardt et al U.S. Pat. No. 2,359,718 wherein sequential heating and cooling steps are effected, requiring the temperature to be varied from about 500° F. to 950° F.

Guillaume J. Kroll discloses, in U.S. Pat. No. 1,428,041, a process for separating metallic constituents from metal alloys wherein alkaline-earth metals, especially calcium, are introduced into the metal alloys.

G. W. Thompson discloses, in U.S. Pat. No. 1,740,752, a process for purifying lead alloys having an overlying interface of caustic alkali containing an oxidizing agent.

DISCLOSURE OF THE INVENTION

The present invention comprehends an improved process for removing and recovering silver and other metal values from lead bullion containing antimony and a low silver content.

The process is intended primarily for use in removing silver from lead bullion containing antimony and less than about 0.005% silver by weight, but may also be utilized to desirably reduce the content of antimony, arsenic, copper, selenium, sulfur and tellurium in the lead bullion.

The process of the invention comprises treating the unrefined lead bullion with calcium at a temperature of about 400° C. to form a floating silver-rich dross comprising a silver-antimony-calcium intermetallic phase and compounds comprised of arsenic, copper, selenium, sulfur and tellurium. The aforementioned intermetallic phase has been analyzed only to the extent that the elements of silver, antimony and calcium have been identified, and for purposes of this invention, this intermetallic phase is herein referred to as a "silver-antimony-calcium compound."

The silver-rich dross compounds and the refined molten lead bullion preferably are separated by removing the refined lead from the kettle and retaining the dross compounds in the kettle. The kettle temperature is maintained at about 400° C. to provide an energy-efficient desilverizing process when successive charges of unrefined lead bullion are processed.

The invention comprehends effecting a number of such lead bullion batch refining operations by successively adding charges of unrefined lead bullion to the kettle which contains the accumulated dross separation from the previous batch operation.

In one form of the invention, the refined or desilvered, molten bullion is withdrawn from below the floating dross by pumping the refined bullion from the kettle in which the process is carried out. This permits an additional charge of unrefined lead bullion to be added to the previously separated dross in a plurality of successive desilverizing and dross formation and accumulation steps, while maintaining the kettle and its contents at a relatively constant temperature of about 400° C. This process thus avoids the energy losses attendant on the prior art processes wherein substantial heating and cooling of the kettle contents is effected to permit separation and removal of silver-containing dross from the processed lead bullion.

The calcium, in one form, is provided as a lead calcium alloy, wherein the weight ratio of the calcium to the lead is 1%. The ratio of lead-calcium alloy added to the unrefined lead bullion charge is about 1:10.

The resultant silver-rich dross, comprised mostly of lead, may be decomposed, such as by oxidation, to remove the calcium and to recombine the silver and antimony with the lead in the dross to form a silver-rich lead bullion. In one form, the decomposition step comprises a step of adding caustic to the dross. In another form, the decomposition step comprises oxidation of calcium by introducing an oxidizing gas, such as air, into the bottom of the dross to facilitate efficient calcium oxidation as the oxidizing gas rises through the dross. The decomposition step may be carried out preferably at a temperature, such as between about 400° C. and 425° C. to maintain the high efficiency of the silver separation process.

BEST MODE FOR CARRYING OUT THE INVENTION

The process of the present invention provides an energy-efficient refining process for the removal of silver and other metal values from lead bullion containing relatively low amounts of silver, antimony and other elements by the addition of calcium to the molten lead bullion. Although the process of the present invention may be used advantageously to remove silver from lead bullion having a silver content substantially higher than 0.005% by weight, it is especially efficient and economical to utilize the present invention for desilverizing lead bullion having a silver content on the order of 0.005%, or less, by weight. For maximum efficiency of the process in removing silver, the process requires the presence of antimony in an amount of at least from 0.25 to 2% by weight of the unrefined lead bullion; however, the antimony may be present in an amount significantly in excess of 2% by weight of the unrefined bullion, or in an amount less than 0.25% by weight, provided that the amount of antimony is sufficient to provide an economic recovery process. Although the process is useful for refining lead bullion by adding calcium to remove, or reduce the level of antimony, arsenic, copper, selenium, sulfur, tellurium and perhaps other values from the bullion, the process as herein described focuses primarily upon the removal of silver from the bullion. Thus, as used herein, the term "dross" is intended to include the compounds of antimony, arsenic, calcium, copper, selenium, silver, sulfur, tellurium, and other elements which, if present, are, dependent upon the initial concentration of the respective element present in the unrefined bullion, substantially removed as dross from the lead bullion in this refining process.

The process contemplates removing most of the silver as well as most of the arsenic, copper, selenium, sulfur and tellurium, if present, from the molten lead bullion in the form of a floating dross. The amount of antimony present in the unrefined bullion determines the percentage or ratio of antimony removed in the process, the ratio of antimony removed being inversely proportional to the percentage present in the unrefined bullion. The dross is comprised primarily of lead and a silver-antimony-calcium compound and compounds of arsenic, copper, selenium, sulfur and tellurium, if present in the unrefined bullion. The concentration of elements, other than those mentioned above, may, if present in the unrefined bullion, remain substantially unchanged in the lead bullion. Formation of the dross is effected by melting a charge of the unrefined lead bullion in a kettle, or container, at a temperture of about 400° C. and adding calcium to the melt. The calcium may be provided in the form of lead calcium alloy, metallic calcium, or calcium affording compound, as desired.

The charge of lead bullion is added to the kettle or container and heated to about 400° C. The calcium affording material is added to the molten bullion and stirring of the bullion and calcium material is effected for an efficient desilverizing reaction. The stirring step is followed by settling, wherein the resultant silver-antimony-calcium compound, along with compounds of arsenic, copper, selenium, sulfur and tellurium in the dross, float to the top of the refined lead bullion.

The floating dross may be separated from the refined molten bullion by conventional steps, such as skimming or using a press, such as a Howard press. However, the invention contemplates an improved highly energy-efficient removal of the dross from the refined molten lead bullion by successive batch operation treatments of unrefined lead bullion without removal from the kettle or container of the silver-rich dross formed. Thus, in this embodiment of the invention, the refined or desilverized molten lead bullion is separated from the silver-rich dross by pumping the refined molten lead bullion from below the dross and leaving the dross in the kettle; however, depending upon the constructional features and embodiments of the kettle, smelter, pot or other vessel or container used, top or bottom pouring or gravitational flow methods for removing the desilverized molten lead bullion may be more desirable.

In order to convert the silver-rich dross into a silver-rich bullion which can be more easily processed or used, the invention contemplates the subsequent removal of calcium from the silver-antimony-calcium compound by subjecting the dross to a decomposition process. Such a decomposition process, for example, may be an oxidation step carried out by subjecting the dross to a caustic treatment, such as by adding caustic soda (sodium hydroxide) or caustic potash (potassium hydroxide), thereby producing a caustic slag. Alternatively, the calcium oxidation may be effected by introducing air, or other oxidizing gases which are compatible with the process, into the lower portion of the dross. The oxidation of the calcium decomposes or breaks up the compound and allows the silver and antimony to recombine with the lead present in the dross to form a silver-rich bullion.

The caustic material may be slowly introduced into the dross while it is being stirred. The caustic treatment may be quickly effected, as the decomposition of the compound in the dross is rapidly completed by the high rate of calcium oxidation.

The resulting slag, comprising sodium or potassium compounds and small amounts of silver, lead and other metal values, formed from the caustic treatment is in the form of chunks which are semi-dry. As the slag is not wetted by the silver-rich bullion and is less dense than the bullion, it floats and is easily removed or skimmed off and further processed or disposed of. The quantity of such slag has been found to be small as compared to the amount of silver-rich dross treated and, typically, may comprise approximately 75 to 100 lbs. of slag per ton of silver-rich dross treated.

The caustic-treatment slag may be further treated to remove entrapped lead therein which has been found to comprise approximately 5 to 10% by weight of the slag.

By adding unrefined bullion and calcium in successive charges, or batch operations, to the previously formed silver-rich dross remaining after removing the refined, or desilverized, lead bullion from the previous step, an energy-efficient lead refining process for desilverizing and removal of other values from lead bullion is provided. By eliminating the need for skimming the silver-rich dross from each of the processed batches until a final accumulated dross is formed, significant time and labor savings are effected as well as substantial savings in energy resulting from the maintained elevated temperature of the materials during the entire plurality of batch treatments.

The final silver-rich bullion resulting from the decomposition of the silver-antimony-calcium compound by calcium oxidation is rich in antimony, silver and other values and may be readily cast into ingots for storage, used as a source of alloying elements, or further processed to recover the silver, antimony and other values by recovery processes well known to those skilled in the art.

By utilizing the successive batch process, improved efficiency in the use of the calcium also is obtained due to the excess or unreacted calcium present in the dross from a previous batch reacting with the antimony and silver in the unrefined bullion introduced thereinto.

The process of the invention provides the only known process for economically removing silver from led bullion having a silver content of about 0.005% or less and is preferably and readily usable in secondary smelters. Thus, silver removal in the range of about 70 to 90% of the silver contained in the unrefined lead bullion has been realized in practicing the process of the invention. Likewise, the described process has resulted in the recovery in the dross of more than 48% of the antimony, 85% of the arsenic, 93% of the copper, 85% of the sulfur and 93% of the tellurium present in the starting bullion and this greatly facilitates and economizes the further refining operation to make soft lead.

The calcium added to the unrefined lead bullion preferably is in the form of Pb—1% Ca master alloy; however, other calcium affording compounds may be substituted therefor and may even be preferred in some circumstances. The calcium, in the form of master alloy, is preferably introduced into the molten lead bullion in the form of small ingots. The desilverizing reaction, wherein the calcium reacts with the silver and antimony to form the intermetallic phase, i.e. the silver-antimony-calcium compound, is rapid or substantially instantaneous. The resulting silver-rich dross is a thick, mushy, metallic dross which rises to the surface of the refined molten lead bullion. It is preferable that the bullion be stirred for a period of from about 1 minute to approximately 5 minutes to facilitate efficient calcium utilization. Longer stirring periods may result in undesirable oxidation of the calcium, thus reducing the efficiency of the desilverizing process. After stirring is completed, the contents of the kettle are allowed to settle for a short period of time, such as 7 to 10 minutes, to allow the silver-rich dross to rise to the surface, before initiating the separation of the refined lead bullion and the dross.

The dross may be skimmed manually from the surface of the molten lead bullion when it is desired to remove the dross in a single batch step. However, the skimming of the dross requires a substantial amount of time, thus, the multiple sequential batch process is highly advantageous and provides a substantial increase in the efficiency of the process.

The following examples are descriptive of the method of the invention and are typical of the results achieved, but unnecessary limiations are not to be implied therefrom:

EXAMPLE 1

1,020 lbs. of unrefined lead bullion charge having 0.0032% silver and 0.35% antimony was divided into three lots of 320 lbs., 350 lbs. and 350 lbs., comprising first, second and third charges. Calcium was provided in the form of Pb—1% Ca master alloy. The refining operation was conducted in a kettle in the following steps:

Run 1:

The first charge of 320 lbs. of lead bullion was added to the kettle and heated to a temperature of 400° C. 32 lbs. of Pb—1% Ca alloy was added. One minute of stirring was followed by 10 minutes of settling. The silver-rich dross was removed from the kettle. The desilverized molten lead bullion was poured from the kettle, the dross was replaced in the kettle and reheated to 400° C.

Run 2:

The dross was maintained at a temperature of 400° C. and the second charge of 350 lbs. of unrefined lead bullion was added to the dross in the kettle from run 1 and the kettle contents heated to 400° C. 35 lbs. of Pb—1% Ca alloy was added. One minute of stirring was followed by 10 minutes of settling and again the desilverized molten lead bullion was separated from the accumulated silver-rich dross as in run 1 and the dross was reheated to a temperature of 400° C.

Run 3:

The third charge of 350 lbs. of unrefined lead bullion was added to the kettle containing the accumulated silver-rich dross from run 2 and the kettle contents again heated to 400° C. 35 lbs. of Pb—1% Ca alloy was added. One minute of stirring was followed by 10 minutes of settling, and again the desilverized molten lead bullion was separated, as described in run 1, from the accumulated silver-rich dross resulting from the three runs. The accumulated silver-rich dross was maintained at a temperature of between about 400° and 425° C.

Approximately 2% of sodium hydroxide (by weight of the dross accumulated in the kettle) was added and stirred into the dross while the temperature was maintained at between 400° and 425° C. The caustic, sodium hydroxide in this instance, oxidized the calcium of the silver-antimony-calcium compound, breaking up the compound and permitting the antimony and silver to recombine with the lead contained in the dross to form a silver-rich bullion.

The resulting slag from the caustic treatment was in the form of semi-dry chunks which were not wetted by the silver-rich bullion and facilitated manual skimming to remove the slag from the silver-rich bullion.

The slag was discarded; however, it could have been retained for further treatment to recover entrapped lead and silver.

A summary of the process is as follows:

Run 1:

320 lbs. of unrefined lead bullion charge
32 lbs. of Pb—1% Ca alloy added
300 lbs. of desilverized bullion pumped out
51 lbs. of silver-rich dross left behind in the kettle

Run 2:

350 lbs. of unrefined lead bullion charge added to the silver-rich dross of Run 1
35 lbs. of Pb—1% Ca alloy added
320 lbs. of desilverized bullion pumped out
110 lbs. of silver-rich dross left behind in the kettle

Run 3:

350 lbs. of unrefined lead bullion charge added to the silver-rich dross of Run 2
35 lbs. of Pb—1% Ca alloy added
312 lbs. of desilverized bullion pumped out
185 lbs. of silver-rich dross left behind in the kettle

Caustic Treatment:

185 lbs. of silver-rich dross accumulated in the kettle
3.5 lbs. of caustic (in the form of sodium hydroxide) added
180 lbs. of silver-rich bullion formed
7.5 lbs. of final semi-dry caustic-treatment slag

NOTES:

1. For purposes of this example, in each run, the resultant silver-rich dross was removed from the kettle and weighed; the desilverized lead bullion was poured from the kettle and weighed; the dross was replaced in the kettle and reheated to 400° C. prior to adding the next charge. This procedure was necessary in order to obtain weights for materials balance. The pouring of the desilverized lead bullion is deemed to be the equivalent of pumping the bullion from beneath the silver-rich dross.
2. Errors appear in the above materials balance due to material handling, spillage and scale errors; however, the errors are not deemed to be significant.

Table I shows the percentage concentration of antimony and silver contained in the starting lead bullion charge used in Example 1, the percentage concentration in the desilverized lead bullion and the percentage of silver removed from the starting material. The charge for this example was a special laboratory-made alloy for testing the present invention and contained no significant concentration of other metal values.

TABLE I

| | Starting Lead Bullion Charge | | Desilverized Lead Bullion | | % Ag |
|---|---|---|---|---|---|
| | Sb % | Ag % | Sb % | Ag % | Removed |
| Run 1 | .35 | .0032 | .19 | .0011 | 66 |
| Run 2 | .34 | .0032 | .14 | .0006 | 81 |
| Run 3 | .35 | .0032 | .19 | .0004 | 88 |
| Analysis of final silver-rich bullion after caustic treatment of silver-rich dross | | | Sb | — | 1% |
| | | | Ag | — | .0150% |
| Final non-metallic caustic-treatment slag (very approximate due to analysis method [spectrographic] used) | | | Sb | — | 2.50% |
| | | | Ag | — | .0090% |

EXAMPLE 2:

In another refining experiment, 80 tons of unrefined lead bullion charge containing 0.003% silver and 0.27% antimony was heated in a 100-ton kettle to 420° C. Calcium was added in the form of Pb—1% Ca master alloy in the amount of six tons in the form of small ingots to partially desilverize the bullion.

The desilverizing reaction, as previously mentioned, was substantially instantaneous to form a thick, mushy, metallic silver-rich dross which rose to the surface of the desilverized molten lead bullion.

The molten bullion was stirred for one minute following the addition and dissolution of the master alloy and then was allowed to settle for 10 minutes before initiating the skimming of the dross. The dross was skimmed manually, using conventional kettle skimmers. A total of 8.5 tons of thick, heavy, mushy silver-rich metallic dross was formed and skimmed off. The dross was very distinct and easily separable from the desilverized molten lead bullion. The average silver content of the dross was 0.011%.

Table II shows the chemical analysis by percentage of the elements contained in the starting bullion charge, final desilverized bullion and the silver-rich dross; Table III shows the mass balance of the elements removed from the charge material; and Table IV shows the percentage of removal of elements from the starting bullion charge.

TABLE II

| | CHEMICAL ANALYSIS - BY % | | | | | | |
|---|---|---|---|---|---|---|---|
| | Ag | Sb | As | Cu | Te | Bi | S |
| Starting Bullion Charge | .0030 | 0.27 | .0039 | .0556 | .0014 | .013 | .0021 |
| Final Desilverized Bullion | .0020 | 0.14 | .0006 | .0037 | .0001 | .013 | .0003 |
| Silver-rich Dross | .0110 | 1.82 | .0654 | .4900 | .0120 | .012 | .0170 |

Data Used: Starting bullion - 80 tons
Pb - 1% Ca Master alloy added - 6 tons
(Ag content of master alloy <.0005% by wt.)
Dross - 8.5 tons
Final Bullion - 77.5 tons

TABLE III

| | MASS BALANCE OF ELEMENTS REMOVED | | | |
|---|---|---|---|---|
| | 1 Content in Starting Bullion Charge (1000 × tons) | 2 Content in Final Desilverized Bullion (1000 × tons) | 3 Theoritcal Expected Content in the Silver-rich Dross (1-2) (1000 × tons) | 4 Actual Content in the Silver-rich Dross (1000 × tons) |
| Silver | 2.40 | 1.55 | 0.85 | .93 |
| Antimony | 216.0 | 110.9 | 105.10 | 154.70 |
| Arsenic | 3.12 | 0.46 | 2.66 | 5.56 |
| Copper | 44.80 | 2.90 | 41.90 | 41.65 |
| Tellurium | 1.12 | 0.08 | 1.04 | 1.02 |
| Sulfur | 1.68 | 0.23 | 1.45 | 1.45 |

NOTES:
1. The material weights shown in Table III are calculated using data from Table II.
2. The discrepancies observed in comparing columns 3 and 4 of Table III are due primarily to the highly segregated nature of the elements in the dross which affects the silver-rich dross analysis of Table II.

TABLE IV

| | REMOVAL OF ELEMENTS FROM STARTING BULLION CHARGE | |
|---|---|---|
| Element | On "ppm" basis | On "mass balance" basis |
| Silver | 33% | 35% |
| Antimony | 48% | 49% |
| Arsenic | 85% | 85% |
| Copper | 93% | 93.5% |
| Tellurium | 93% | 93% |
| Sulfur | 85% | 86% |

EXAMPLE 3

As previously mentioned, oxidation of the calcium in the silver-antimony-calcium compound may also be accomplished by introducing air below the silver-rich dross. In this example, an accumulated silver-rich dross, similar to that produced in Example 1, was heated to between 400° and 425° C. An air lance was then inserted to introduce air into the kettle at the bottom of the dross. The oxygen of the air oxidized the calcium of the silver-antimony-calcium compound. Along with the calcium, some antimony and lead also were oxidized by the air to form a characteristically dry powdery oxide dross or slag which floats on the surface of the molten silver-rich bullion and was easily skimmed off. The oxidation of the calcium permits the silver and antimony, as in Example 1, to recombine with the lead in the silver-rich dross to form a silver-rich lead bullion.

Thus, as can be seen from the above examples, the desilverizing and refining process of the present invention is intended primarily for use when the silver content of the starting bullion to be refined is less than 0.005%. By using the necessary amount of calcium, the process desilverizes the bullion to less than 0.001% silver in an energy efficient manner.

The invention further comprehends decomposing the silver-rich dross to separate the silver and antimony from the calcium by calcium oxidation. The oxidation may be effected by introduction of air into the dross, as well as by addition of caustic, such as sodium hydroxide or potassium hydroxide, and the like to effect the recombination of the silver and antimony with the lead in the dross to form a silver-rich bullion which may be used or further processed.

The desilverizing and refining process is carried out at a relatively low temperature of about 400° C. This temperature is maintained throughout the successive batch operations, in order to realize improved energy efficiency, control of undesirable calcium oxidation and significant reduction of the time required by this process as contrasted by the processes of the prior art in cooling and reheating the bullion over a wide temperature range.

Separation of the silver-rich dross may be effected by pumping the molten desilverized lead bullion from below the dross, by skimming of the dross using conventional skimmers, a dross press, the basket method or any other convenient method.

Industrial Applicability

The desilverized and refining process of the present invention is advantageously adapted preferably for use in secondary lead smelters, and primary smelters if desired, for removal of silver and other metal values from lead base alloys having low silver content and wherein antimony is present in sufficient amount to form, with added calcium, a silver-antimony-calcium compound. As previously stated, the process of this invention, when maintained at about 400° C. over successive batch operations, provides improved energy efficiency by eliminating cooling and reheating cycles in effecting the desilverization.

The foregoing detailed description is provided for clarity only and no unnecessary limitations should be understood therefrom, as modifications will be obvious to those skilled in the art.

What is claimed is:

1. A process for refining lead bullion containing antimony and silver in an amount less than about 0.005% by weight, comprising the steps of:
   (a) adding lead bullion to a container in which said bullion is to be heated;
   (b) heating said bullion above its melting temperature to form a molten lead bullion;
   (c) adding a calcium affording compound to said molten lead bullion;
   (d) mixing the calcium into said molten bullion to form a floating silver-rich dross and a desilverized molten lead bullion;
   (e) separating said desilverized molten lead bullion from said dross;
   (f) repeating said steps (a) through (e) in successive batch operations; and
   (g) accumulating in said container the silver-rich dross resulting from each of said successive batch operations.

2. A process as set forth in claim 1, wherein said silver-rich dross comprises a silver-antimony-calcium compound.

3. A process as set forth in claim 1, wherein the temperature of said retained dross during said repeated batch operations is maintained at about 400° C.

4. A process as set forth in claim 1, wherein said process is carried out at a temperature of from about 400° C. to 425° C.

5. A process for refining lead bullion containing antimony, silver and other metal values, comprising the steps of:
   (a) adding lead bullion to a container in which said bullion is to be refined;
   (b) heating said bullion to form a molten lead bullion;
   (c) adding a calcium affording compound to said molten lead bullion;
   (d) reacting said calcium with said molten lead bullion to form a refined lead bullion and a floating dross comprising lead and metal values; and
   (e) separating said refined molten lead bullion from said dross;
   (f) repeating said steps (a) through (e) in a plurality of batch operations; and
   (g) retaining the dross in the container from each batch operation to accumulate the dross.

6. A process as set forth in claim 5, wherein said refined lead bullion contains less than about 0.01% silver by weight.

7. A process as set forth in claim 5, wherein said lead bullion added to said container comprises antimony in an amount not in excess of about 6% by weight.

8. A process as set forth in claim 5, wherein said lead bullion added to said container comprises silver in an amount not in excess of about 0.02% by weight.

9. A process as set forth in claim 5, wherein said lead bullion added to said container comprises antimony in an amount not in excess of about 6% and silver in an amount not in excess of about 0.02% by weight.

10. A process as set forth in claim 5, wherein the accumulated dross from each batch operation is maintained at a temperature of about 400° C. in preparation for the succeeding batch operation.

11. A process as set forth in claim 5, wherein said metal values comprise a silver-antimony-calcium compound.

12. A process as set forth in claim 5, wherein said dross is further processed by the steps of:
   (a) maintaining said dross in a molten state;
   (b) introducing an oxidizing agent into said molten dross to decompose said silver-antimony-calcium compound and form a silver-rich lead bullion and a slag; and
   (c) separating said silver-rich lead bullion from said slag.

13. A process as set forth in claim 12, wherein said oxidizing agent is a caustic.

14. A process as set forth in claim 12, wherein said oxidizing agent is an oxidizing gas.

15. A process as set forth in claim 14, wherein said oxidizing gas is air.

16. A process as set forth in claim 13, wherein said caustic is a member selected from the group comprising sodium hydroxide, potassium hydroxide and mixtures thereof.

17. A process as set forth in claim 5, wherein said metal values comprise a silver-antimony-calcium compound.

18. A process as set forth in claim 17, wherein said dross is further processed by the steps of:
(a) maintaining said dross in a molten state;
(b) introducing an oxidizing agent to said molten dross to decompose said compound
(c) decomposing said compound to recombine the silver and antimony with the lead in said dross to form a silver-rich lead bullion and to form a slag comprising calcium compounds; and
(d) separating said silver-rich lead bullion from said slag.

19. A process as set forth in claim 18, wherein said oxidizing agent is a caustic.

20. A process as set forth in claim 18, wherein said oxidizing agent is an oxidizing gas.

21. A process as set forth in claim 20, wherein said oxidizing gas is air.

22. A process as set forth in claim 19, wherein said caustic is a member selected from the group comprising sodium hydroxide, potassium hydroxide and mixtures thereof.

23. A process for refining lead bullion containing antimony, silver and other metal values, comprising the steps of:
(a) adding lead bullion to a container in which said bullion is to be refined;
(b) heating said bullion to a temperature of about 400° C. to form a molten lead bullion;
(c) adding a calcium affording compound to said molten lead bullion;
(d) reacting said calcium with said molten lead bullion to desilverize said bullion, form a refined lead bullion and a silver-rich floating dross comprising lead, a silver-antimony-calcium compound and other metal values;
(e) separating said refined lead bullion from said dross;
(f) repeating steps (a) through (e) in a plurality of batch operations in which the dross from each preceding operation is retained in said container and accumulated with the dross of each successive batch operation;
(g) maintaining said dross in a molten state;
(h) introducing an oxidizing agent into said molten dross to decompose said compound and form a silver-rich lead bullion and a slag;
(i) separating said silver-rich lead bullion from said slag.

24. A process as set forth in claim 23, wherein said process includes the step of maintaining the temperature of about 400° C. throughout the plurality of successive batch operations.

25. A process as set forth in claim 24, wherein the decomposition step involving said compound is performed at a temperature of about 400° C. to 425° C.

26. A process as set forth in claim 24, wherein said calcium is added in the form of a lead-calcium alloy.

27. A process as set forth in claim 24, wherein said oxidizing agent is selected from a member of the group comprising sodium hydroxide, potassium hydroxide and mixtures thereof.

28. A process as set forth in claim 23, wherein the antimony content of said bullion is at least about 0.25% by weight.

29. A process as set forth in claim 23, wherein the silver content of said bullion is about 0.005% by weight or less.

30. A process as set forth in claim 23, wherein said oxidizing agent is an oxidizing gas.

31. A process as set forth in claim 30, wherein said oxidizing gas is air.

32. A process for removing silver and other metal values from lead bullion containing less than about 2% antimony and less than about 0.005% silver, comprising the steps of:
(a) melting a first charge of the lead bullion at a temperature of about 400° C.;
(b) adding a calcium affording material to the melt to form a floating dross comprising a silver-antimony-calcium compound and other metal values;
(c) separating the desilverized bullion from the dross while maintaining the temperature thereof at about 400° C.;
(d) adding a second charge of the lead bullion to the separated dross and melting the same at about 400° C. with additional calcium;
(e) separating the desilverized bullion from the resultant dross while maintaining the temperature thereof at about 400° C.;
(f) adding a third charge of the lead bullion to the separated resultant dross and melting the same at about 400° C. with additional calcium; and
(g) separating the desilverized bullion from the resultant floating dross for the subsequent use of the dross.

33. A process for removing silver and other metal values from lead bullion containing less than about 2% antimony and less than about 0.005% silver, comprising the steps of:
(a) melting a first charge of the lead bullion at a temperature of about 400° C.;
(b) adding a calcium affording material to the melt to form a floating dross comprising a silver-antimony-calcium compound and other metal values;
(c) adding a second charge of the lead bullion to the separated dross and melting the same at about 400° C. with additional calcium;
(d) separating the desilverized bullion from the resultant floating dross for the subsequent use of the dross; and
(e) oxidizing the calcium of the silver-antimony-calcium compound to decompose the calcium and return the silver and antimony to a silver-rich bullion form.

34. A process as set forth in claim 33, wherein the step of oxidizing the calcium is carried out at a temperature of between about 400° C. and 425° C.

35. A process as set forth in claim 33, wherein the step of oxidizing the calcium comprises a step of adding caustic to the final accumulated dross.

36. A process as set forth in claim 35, wherein the caustic is stirred into the dross.

37. A process as set forth in claim 35, wherein the caustic is added in a weight ratio of about 2% of the weight of the dross.

38. A process as set forth in claim 35, wherein the caustic is added while maintaining the dross at a temperature of between about 400° C. and 425° C.

39. A process as set forth in claim 35, wherein the slag formed by the caustic addition to the dross is removed by a step of skimming the slag from the surface of the treated dross.

40. A process as set forth in claim 33, wherein the step of oxidizing the calcium comprises a step of introducing air into the accumulated dross.

41. A process as set forth in claim 33, wherein the step of oxidizing the calcium comprises a step of introducing air into the accumulated dross while maintaining the dross at a temperature of between 400° C. and 425° C.

42. A process as set forth in claim 33, wherein the step of oxidizing the calcium comprises a step of introducing air into the accumulated dross at the bottom thereof while maintaining the dross at a temperature of between 400° C. and 425° C.

* * * * *